United States Patent
Reddy

(10) Patent No.: US 10,332,012 B2
(45) Date of Patent: Jun. 25, 2019

(54) KNOWLEDGE DRIVEN SOLUTION INFERENCE

(71) Applicant: SAP SE, Walldorf (DE)

(72) Inventor: Srinivasa Byaiah Ramachandra Reddy, Bangalore (IN)

(73) Assignee: SAP SE, Walldorf (DE)

( * ) Notice: Subject to any disclaimer, the term of this patent is extended or adjusted under 35 U.S.C. 154(b) by 825 days.

(21) Appl. No.: 14/877,939

(22) Filed: Oct. 8, 2015

(65) Prior Publication Data
US 2017/0103329 A1    Apr. 13, 2017

(51) Int. Cl.
| G06N 5/04 | (2006.01) |
| G06Q 30/00 | (2012.01) |
| G06F 16/00 | (2019.01) |

(52) U.S. Cl.
CPC ............ *G06N 5/04* (2013.01); *G06F 16/00* (2019.01); *G06Q 30/016* (2013.01)

(58) Field of Classification Search
CPC ..... G06F 7/06; G06F 7/00; G06F 7/02; G06F 7/023; G06F 8/00; G06F 15/18; G06F 17/00; G06F 17/20; G06F 17/21; G06N 99/005; G06N 5/04; G05B 13/00
See application file for complete search history.

(56) References Cited

U.S. PATENT DOCUMENTS

| 5,842,213 | A * | 11/1998 | Odom ............... G06F 17/30607 |
| 6,938,000 | B2  | 8/2005  | Joseph et al. |
| 7,310,625 | B2  | 12/2007 | Wu |
| 7,418,628 | B2  | 8/2008  | Arend |
| 7,814,048 | B2  | 10/2010 | Zhou et al. |
| 9,619,555 | B2* | 4/2017  | Anwar ............... G06F 17/30684 |
| 2007/0094219 | A1 | 4/2007 | Kipersztok |
| 2012/0016678 | A1* | 1/2012 | Gruber ............... G06F 17/3087 |
|  |  |  | 704/275 |
| 2012/0102050 | A1 | 4/2012 | Button et al. |
| 2015/0074095 | A1* | 3/2015 | Enders .................. G06F 17/27 |
|  |  |  | 707/725 |
| 2016/0239487 | A1* | 8/2016 | Potharaju ............ G06F 17/3053 |

FOREIGN PATENT DOCUMENTS

| CN | 101296154 A | 10/2008 |
| JP | 2000057066 A * | 2/2000 |

* cited by examiner

*Primary Examiner* — Alan Chen
(74) *Attorney, Agent, or Firm* — Fish & Richardson P.C.

(57) ABSTRACT

Various embodiments of systems and methods to provide a knowledge driven solution inference are described herein. In one aspect, unstructured data is retrieved from one or more information sources. Data segments corresponding to a plurality of categories are identified in the extracted unstructured data by natural language processing. Further, the data segments are grouped into a plurality of data clusters based on scores between the data segments. The structured knowledge base is generated by linking the associated plurality of data clusters. The knowledge driven solution inference is provided based on the generated knowledge base.

20 Claims, 16 Drawing Sheets

CUSTOMER MESSAGE 405: 000000 00001 2011

SHORT TEXT 410:
PROBLEM FINDING RELEVANT INFORMATION FOR PROBLEM.

MESSAGE ATTRIBUTES 415
PROCESSOR <processor>
ENTERED ON <date>
HIGH PRIORITY
LANGUAGE EN
AUTO STATUS CONFIRMED
COMPONENT BC-GENERAL DESCRIPTION 420:
Hi,
We recently rolled out few products and introduced a separate support unit for these new products. Our support unit is having major trouble and is not able to quickly process the customer issue. Large amount of time if getting wasted in searching and finding the relevant information to solve the given problem. We are looking for a system which will act as expert and provide solution or various approach in order to solve a given problem.
Regards,
Vendor BUSINESS IMPACT 425:
LARGE AMOUNT OF TIME AND MONEY IS BEING SPENT FOR MANUALLY PERFORMING THE PROBLEM SOLVING.

FIG. 4A

INTERNAL MEMO:
Dear Developer,

Our vendor is facing problem in managing and effectively utilizing the distribute unstructured data. Kindly take over and assist vendor here.

Regards,
Consultant

REPLY  430
Hi Vendor,
We have developed a system which will convert the unstructured data into a structure format. This Imitative Expert Reasoning System provides Knowledge assistance towards problem solving. The system leverages the 'knowledge base' on HANA platform, which is built using unsupervised, domain independent, data mining, knowledge discovery and machine learning techniques.

When a new issue is reported by your customer, the proposed expert system would provide possible solution or suggestions, code fix, list our various methodologies towards solving the problem. System can also generate self generate self adopting knowledge documents and decision tress for problem solving.

Regards,
Developer

INFORMATION FOR CONSULTANT
Hello Developer,

Thanks a lot. This is exactly the expert system we were looking for which would solve a given problem. I am happy to close this incident.

Regards,
Vendor

FIG. 4B

ROOT CAUSE 505:

| MESSAGE TEXT | ROOT CAUSE | ISSUE | GOAL | SOLUTION | QUESTION_ANSWERES | APPROACHES | KEYWORDS |

- We recently rolled out few products and introduced a separate support unit for these new products. 500A

KEY ISSUE DESCRIPTION 510:

| MESSAGE TEXT | ROOT CAUSE | ISSUE | GOAL | SOLUTION | QUESTION_ANSWERES | APPROACHES | KEYWORDS |

500B

- Our support unit is having major trouble and is not able to quickly process the customer issue.
- Large amount of time is getting wasted in searching and finding the relevant information to solve the given problem.

GOAL 515:

| MESSAGE TEXT | ROOT CAUSE | ISSUE | GOAL | SOLUTION | QUESTION_ANSWERES | APPROACHES | KEYWORDS |

- We are looking for a system which will act as expert and provide solution or various approach in order to solve a given problem.

SOLUTION 520:

| MESSAGE TEXT | ROOT CAUSE | ISSUE | GOAL | SOLUTION | QUESTION_ANSWERES | APPROACHES | KEYWORDS |

- We have developed a system which will convert the unstructured data into a structured format. This Imitative Expert Reasoning System provides Knowledge assistance towards problem solving.
  500D
- The system leverages the knowledge base on HANA platform, which is built using unsupervised, domain independent, data mining, knowledge discovery and machine learning techniques.
- When a new issue is reported by your customer, the proposed expert system would provide possible solution or suggestions, code fix, list out various methodologies towards solving the problem. System can also generate self adopting knowledge documents and decision trees for problem solving.

QUESTIONS WITH MATCHED ANSWERS 525:

| MESSAGE TEXT | ROOT CAUSE | ISSUE | GOAL | SOLUTION | QUESTION_ANSWERES | APPROACHES | KEYWORDS |

500E

- Why are you unable to perform this task using the currently available search tools? (from consultant)
  Matched Answer: (from vendor)
  We often do not use these search tools because:
  1. Results returned by these tools are not readily utilisable
  2. Returns large number of hits and requires users to manually go through these to gather information pertaining to the problem.
  3. This process is time consuming and has unpredictable success rate.
- Can you help us to run our business better? (from vendor)
  No matched answers

FIG. 5B

CUSTOMER

WHEN WE RUN THE REPORT RSFILECR (IN THE MANUAL ACTIVITY) IT IS SHOWN THE S ERROR "THE PROGRAM RSFILECR" IS NOT UNICODE-COMPATIBLE

SOLUTION

PLEASE NOTE THAT YOU SHOULD HAVE APPLIED THE CORRECTION INSTRUCTIONS ACCORDING TO NOTE 1497003 NOTE 1543851 IS ONLY RELEVANT IF YOU CANNOT IMPORT THE TRANSPORT REQUEST FROM NOTE 1497003 IN ANY ADDITIONAL SYSTEMS BY ITSELF (UNLESS IT IS THE DEVELOPMENT / CORRECTION SYSTEM LANDSCAPE). BUT ONCE YOU HAVE IMPLEMENTED THE NOTE IN THE DEVELOPMENT SYSTEM, PLEASE TRANSPORT THE CHANGES IN ONE COLLECTIVE TRANSPORT REQUEST THROUGHOUT THAT SYSTEM LANDSCAPE. YOU CAN JUST LEAVE THE CORRECTIONS FROM NOTE 1543852 IN YOUR SYSTEM SINCE THEY BASICALLY CREATE THE SAME THING AS APPLYING THE TRANSPORT REQUEST AND NOTE 1497003. BUT GO AHEAD AND APPLY THE CORRECTION INSTRUCTIONS OF NOTE 1497003 VIA SNOTE. YOU CAN IGNORE ANY MESSAGES S SNOTE THAT THE CHANGES ALREADY EXIST OR CAN ONLY BE PARTIALLY IMPLEMENTED. THE ONLY IMPORT OBJECT IS THAT APPLYING 1497003 VIA SNOTE AT THIS POINT WILL CREATE RSFILECR WHICH IS WHAT YOU ARE LOOKING FOR IMPORT THE TRANSPORT REQUEST FIRST THEN IMPLEMENT THE CORRECTIONS AND THEN BE SURE TO FOLLOW THE INSTRUCTIONS IN THE MANUAL PEST-IMPLEMENTATION STEPS IT IS VERY IMPORTANT THAT YOU COLLECT ALL CHANGES AND OBJECTS RELEVANT TO THIS NOTE (INCLUDING THE EMPORTED.

COULD YOU KINDLY DOWNLOAD THE CORRECTION REQUEST FROM LATEST VERSION OF NOTE 1497003 AND TRY TO REIMPORT THIS REQUEST WITH THE OPTION "OVERWRITING OBJECTS IN UNCONFIRMED REPAIRS"

YOU HAVE IMPORTED 620 BASIS_620_AND_HIGHER.ZIP AND ALSO RSFILECR.ZIP WHICH WAS NOT NECESSARY.

1100

CUSTOMER ( LIKE 1110A )  ( DISLIKE 1110B )

( SEND )

( CLEAR )

FIG. 11

KNOWLEDGE DRIVEN SOLUTION INFERENCE

FIELD

Embodiments generally relate to computer systems and more particularly to methods and systems to provide a knowledge driven solution inference.

BACKGROUND

Customer service and support plays an important role in long term customer experience and customer retention. Providing quality service depends on the expertise of customer support associates and information sources such as incident management systems, developer communities and the like. Information may be in the form of distributed unstructured data. Thereby, effectively utilizing the unstructured data towards providing services may be challenging as the amount of unstructured data builds over time, and remains untapped. Further, it is challenging to retrieve a relevant solution from the information sources for a customer query.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 4A is an example incident document, according to an embodiment.

FIG. 4B is an example incident document representing a solution to the message of FIG. 4A, according to an embodiment.

FIGS. 5A and 5B are examples of data segments in different categories identified from the unstructured input data of FIGS. 4A and 4B, according to an embodiment.

FIG. 11 is an example screenshot of a user interface of a knowledge driven solution inference system, according to an embodiment.

DETAILED DESCRIPTION

Embodiments of techniques to provide a knowledge driven solution inference are described herein. In the below description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

References throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification arenot necessarily all referring to the same embodiment. Furthermore, the particular features, structures, or characteristics may be combined in any suitable manner in one or more embodiments.

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. Upon completion of the first step, a second step is executed. Such a situation will be specifically pointed out when not clear from the context. Further, a particular step may be omitted. A particular step is required only when its omission would materially impact another step.

In this document, various computer-implemented methods, processes and procedures are described. It is to be understood that the various actions (determining, identifying, notifying, storing, retrieving, etc.) are performed by a hardware device (e.g., computing system), even if the action may be authorized, initiated or triggered by a user, or even if the hardware device is controlled by a computer program, software, firmware, and the like. Further, it is to be understood that the hardware device is operating on data, even if the data may represent concepts or real-world objects, thus the explicit labeling as "data" as such is omitted.

Figure 1:
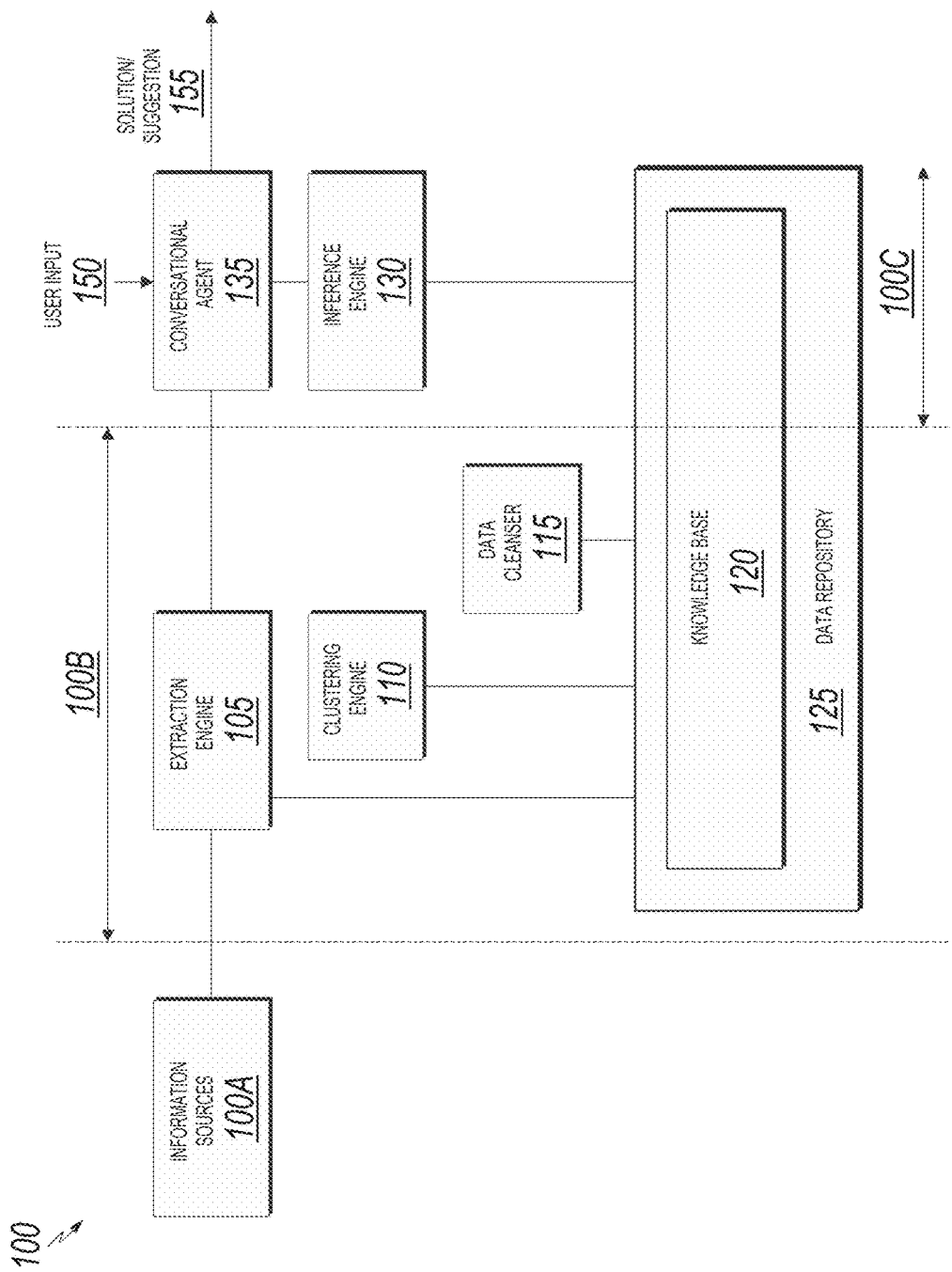
FIG. 1 is a block diagram illustrating an example system to provide a knowledge driven solution inference, according to an embodiment.

FIG. 1 is a block diagram illustrating example system 100 to provide a knowledge driven solution inference, according to an embodiment. The system 100 may include three main sections such as information sources 100A, knowledge extraction (e.g., 100B) and knowledge delivery (e.g., 100C) to provide a knowledge driven solution inference. In one embodiment, a structured knowledge base 120 is generated based on unstructured information extracted from the information sources 100A. Further, the knowledge driven solution inference is provided based on content in the knowledge base 120 when a query or problem is received from a customer.

The knowledge extraction (e.g., 100B) includes extraction engine 105 to extract data from the information sources 100A, clustering engine 110 to organize the extracted data, data cleanser 115 to process and remove unwanted data from the extracted data, and the knowledge base 120 for storing the extracted data in data repository 125. In one embodiment, the extraction engine 105 extracts unstructured and/or semi-structured data from multiple information sources 100A such as, but not limited to incident or case documents, product forum pages, product technical documentation, and electronic encyclopedias (e.g. product wiki pages) of different document type. The incident or case documents may include conversational text between product experts and customers or vendors. In other words, the incident documents include various prior approaches and solutions provided by the product experts to solve the reported incident. The product forums pages may include discussions between multiple users, such as data related to user reporting problems and other users providing inputs or steps or information to solve the problem. The product technical documentation and/or product wiki pages are used to extract key-value pairs referred to as knowledge bits. A key may be a technical keyword or key phrase, e.g., phrase describing a topic, name of a function module or method of a class, transaction name and the like. The value may be the extracted knowledge corresponding to the key. For example "Report ADB-C_DEMO" is a report used as a demo of database connectivity (e.g., Advanced Business Application Programming (ABAP®) database connectivity). The report is used to connect different databases. "Transaction VA01" is a transaction to create a sales order in an Enterprise resource planning (ERP) system. Further, the extraction engine 105 processes the input documents to convert the unstructured and/or semi-structured data into structured data.

In one embodiment, the knowledge base 120 includes information to understand, analyze and assist with decision making and providing solutions to the problems reported by the customers. In other words, the extraction engine 105 can be configured to learn from existing volume of unstructured data available in the form of incident messages, documents, past experience and through inputs provide by the domain experts. Further, the extraction engine 105 converts unstructured data into structured information, identifies data segments of interest and relationship among the identified data segments. The extracted and structured information is utilized to build the knowledge base 120. The extraction engine 105 may also be configured to process user input 150 to determine a type of input and map the user input 150 to an action to be performed by the inference engine 130.

In one embodiment, the clustering engine 110 identifies categories, and builds data clusters of data segments in different categories, such as but are not limited to problem clusters, solution clusters, root cause clusters, and approach clusters. When the clustering engine 110 groups the unstructured data (e.g. incident messages) into data segments, the data segments are grouped together depending on their similarity to generate clusters of nodes. The nodes correspond to the data segments. The clustering may be performed for different categories of data, such as, problem, solution, root cause, and approach to generate problem clusters, solution clusters, root cause clusters, and approach clusters.

In an embodiment, the clustering engine 110 groups solutions by relevancy of text irrespective of underlying components or entities. Grouping based on relevancy of text to generate a cluster results in grouping solutions of different components together. The clustering engine 110 learns from corresponding problem statements and formulates a single solution for the data cluster. For example, the clustering engine 110 generates a problem cluster irrespective of the components to which the problems belong. Further, the clustering engine 110 links data segments across the data clusters of different categories. For example, the clustering engine 110 links data segments of a problem cluster to data segments of a solution cluster based on semantic relationship between the problem cluster and the solution cluster.

The knowledge base 120 is constructed with the extracted data in the form of clusters of data segments. The knowledge base 120 stores problem solving data, knowledge facts, hard and fast rules, possible approaches and theories about a problem area. The knowledge base 120 may be configured to recognize relative importance of different entities based on the context, provide inference capability based on a new problem context to assist the process of decision making.

The data cleanser 115 is configured to cleanse unwanted data from the structured data. The process of data cleansing may be achieved through supervised machine learning capabilities, for instance. The data cleansing can be specific to a customer dataset. For example, messages such as "this message is created from XYZ system" and "the message is automatically confirmed by a batch report as it was in closed state for 60 days" are used to setup an incident handling process specific to the customer dataset. The knowledge delivery (e.g., 100C) includes inference engine 130 for searching the knowledge base 120 and conversational agent 135 for facilitating user interaction such as receiving user input or problem or report 150 and providing solutions or suggestions 155.

The conversational agent 135 (e.g. chatterbot) is configured to accept the user input 150 and provide a solution through an interactive session. The extraction engine 105 screens the user input 150 to extract different entities from the user input 150. The user input 150 may be then converted into an appropriate query and sent to the inference engine 130. Depending on the response from the inference engine 130, the conversational agent 135 either displays the response (e.g. solution) directly to the end user or displays appropriate questions to solicit more information from the end user to process further.

The inference engine 130 uses the user input 150 to search for a similar problem and/or solution in the knowledge base built by the clustering engine 110. In other words, the inference engine 130 identifies a solution to a given problem based on a similarity of the given problem to existing problem/solution clusters in the knowledge base 120. In exemplary embodiment, the inference engine 130 may display recommended notes to solve the problem or possible approaches to solve the problem in scenarios where the exact solution cannot be inferred.

Figure 2:
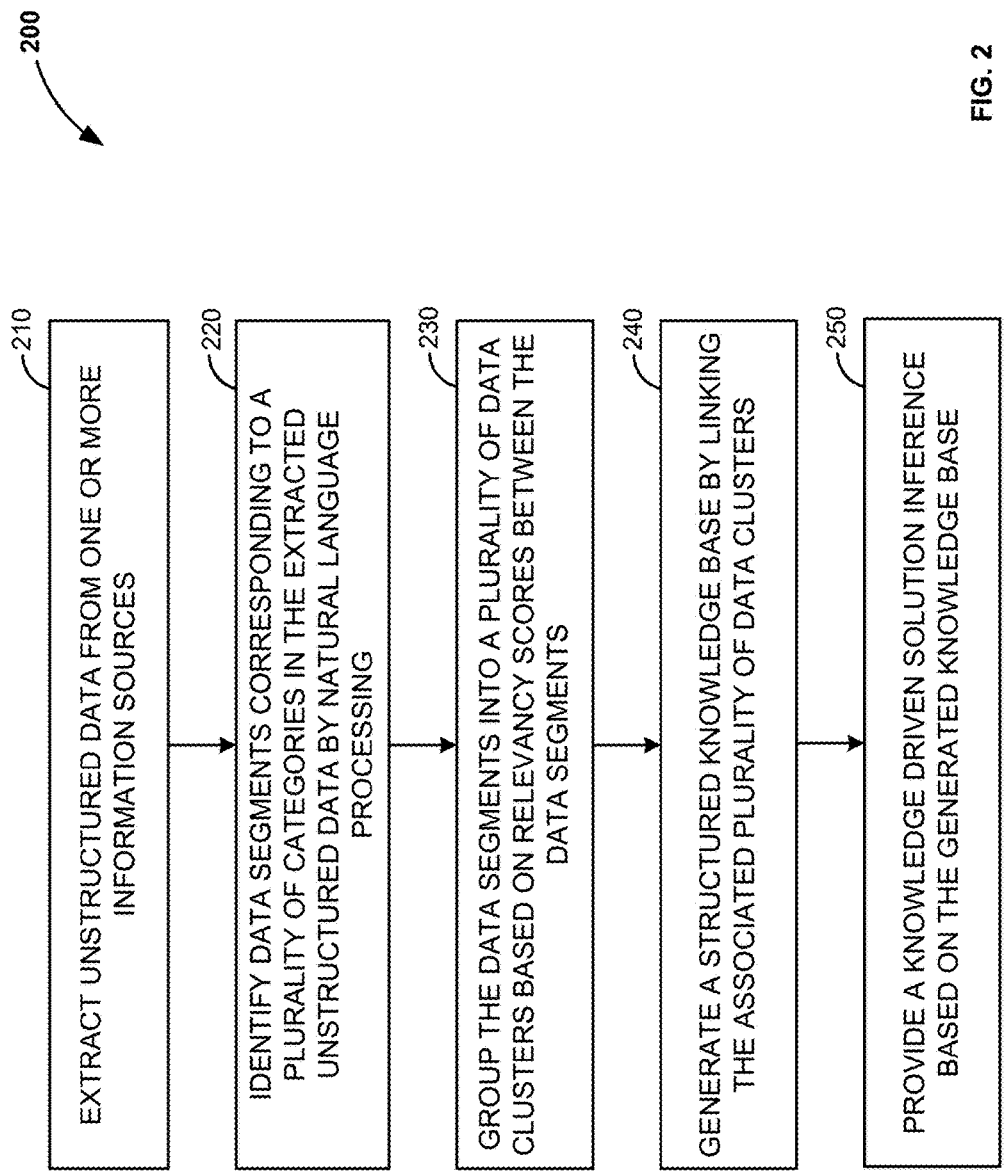
FIG. 2 is a flow diagram illustrating an example process to provide a knowledge driven solution inference, according to an embodiment.

FIG. 2 is a flow diagram illustrating example process 200 to provide a knowledge driven solution inference, according to an embodiment. At 210, unstructured data is extracted from one or more information sources. The information sources can be, but not limited to incident or case documents, product forum pages, product technical documentation, and electronic encyclopedias (e.g. product wiki pages). Since the data is distributed in different information sources having different data format, the data in the information sources can be unstructured or semi-structured.

At 220, data segments corresponding to a plurality of categories are identified in the extracted unstructured data by natural language processing. The categories can be, but are not limited to problems, solutions, root cause, and approach. At 230, the data segments are grouped into a plurality of data clusters based on scores between the data segments. Grouping the data segments is described with an example in FIGS.

7 and 8. At 240, a structured knowledge base is generated by linking the associated plurality of data clusters. Linking the associated data clusters is described in greater detail in FIG. 9.

At 250, a knowledge driven solution inference is provided based on the generated knowledge base. In one exemplary embodiment, when an input query or a problem is received, one or more solutions to the input query are retrieved by matching the input query to the plurality of data clusters in the knowledgebase and the retrieved solutions are rendered to a customer. Further, when a follow up query is received, a new solution is rendered in response to the follow up query based on the rendered solutions, which is described with an example in FIGS. 10 to 12.

Figure 3:
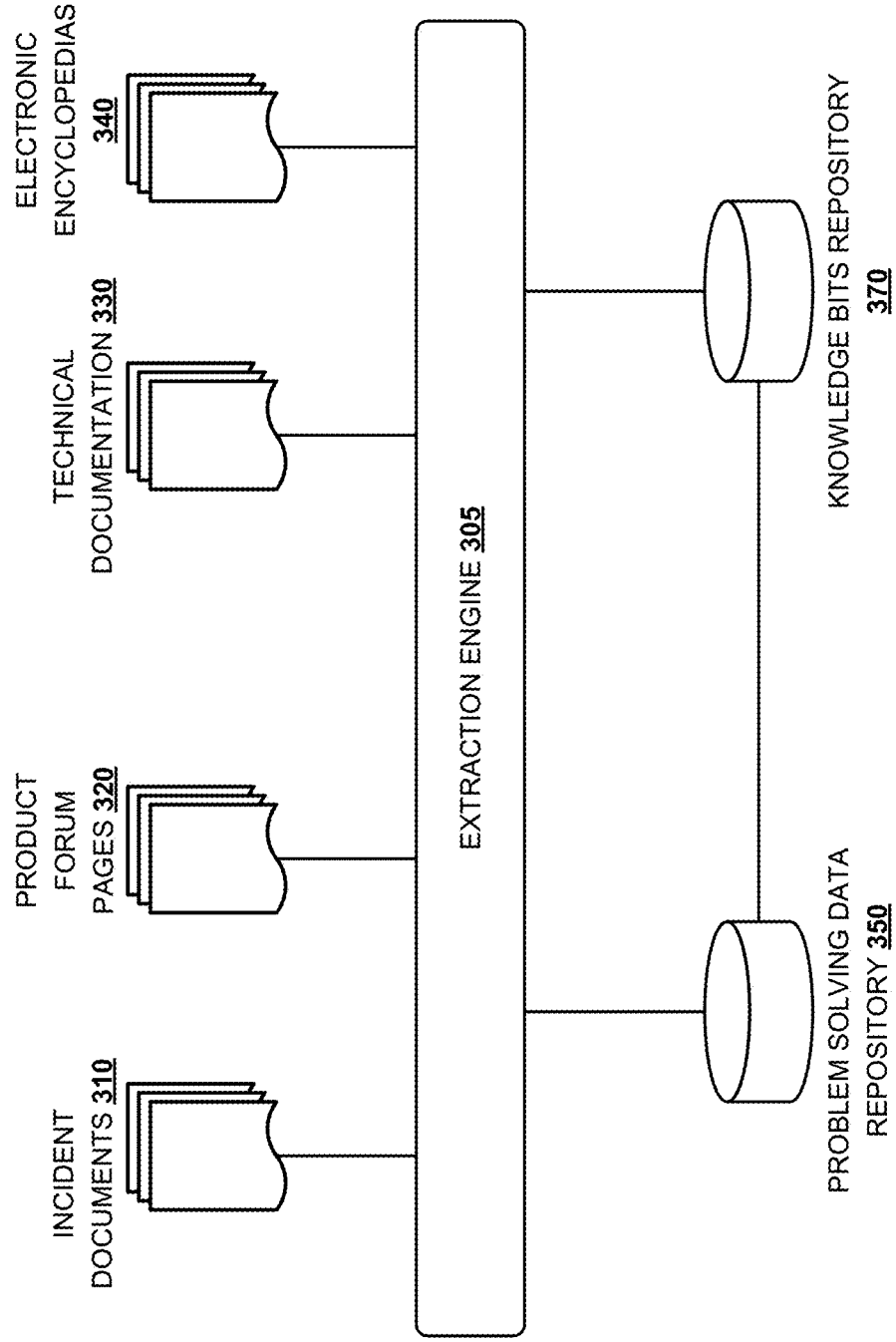
FIG. 3 is a block diagram illustrating extraction of unstructured data from information sources, according to an embodiment.

FIG. 3 is a block diagram illustrating extraction of unstructured data from information sources, according to an embodiment. Extraction engine 305 extracts input documents from various information sources such as, but are not limited to incident documents 310, forum pages 320, technical documentation 330 and electronic encyclopedias 340 (e.g., product wiki pages). In one embodiment, the extraction engine 305 converts unstructured data into structured information, identifies data segments of interest, and establishes relationship among the identified data segments. The extracted and structured information is then utilized to build a knowledge base.

The incident or case documents 310 may include conversational text between product experts and customers or vendors, for instance. The incident documents 310 may be in semi-structured or unstructured format and contain information about incidents reported by the customers or vendors with regard to a product. The incident documents 310 may also include information regarding various approaches to resolve the reported incidents and final solutions provided by the product experts to solve the reported incidents.

The product forums pages 320 include problems reported by users or customers, and inputs or steps or information provided by other users to solve the problem, for instance. The product forum pages 320 may be categorized as semi-structured or unstructured information. In one exemplary embodiment, the product technical documentation 330 and the electronic encyclopedias 340 are accessed to extract key-value pairs called knowledge bits 370. A key is a technical keyword or key phrase, e.g., phrase describing a topic, name of a function module or method of a class, transaction name and the like. A value is the extracted knowledge corresponding to the key. For example, "ABAP-DOCU transaction" includes Advanced Business Application Programming (ABAP®) documentation and examples.

In one exemplary embodiment, the extraction engine 105 automatically extracts problem solving data from the incident documents 310 and product forum pages 320. Further, the extraction engine 305 automatically extracts the knowledge bits 370 from the product technical documentation 330 and the electronic encyclopedias 340. In an embodiment, entities in the problem solving data 350 are semantically linked to the knowledge bits 370 during runtime.

In one embodiment, an extraction process for extracting input data from the incident documents 310 includes defining meta-information of unstructured data for the incident documents 310, filtering and pre-processing the input unstructured data, extracting named entity by information extraction techniques governed by rules, extracting semantic relationship between domain specific entities, semantic mapping towards building structured knowledge base, and validating the extracted knowledge.

For example, the meta-information for incident documents 310 is defined as follows:
Customer Message
    Entity: Short Text
    Entity: Description
        Issue Description
        Root Cause
        Goal to be achieved
        Additional description
    Entity: Steps to reproduce
    Entity: Solution
        Solution Description
        Note provided in solution
        Technical information
    Entity: List of keywords [0 . . . n]
        Keyword
    Entity: Question_Answers [0 . . . n]
        Question
        Answer to question
    Entity: Approaches [0 . . . n]
        Approach
        Result of approach FIG. 4A is an example incident document, according to an embodiment. The incident document includes a message from a customer or vendor. The message includes customer message number 405, short text 410 of an issue, message attributes 415, description 420 of the issue, and business impact 425 of the issue. FIG. 4B is an example incident document representing a solution to the message of FIG. 4A, according to an embodiment. The incident document includes solution 430 to the issue mentioned in FIG. 4A. The solution 430 is provided by a developer to a vendor, for instance.

FIGS. 5A and 5B are examples of data segments in different categories identified from the unstructured input data of FIGS. 4A and 4B, according to an embodiment. The categories include, but are not limited to root cause 505, key issue description 510, goal 515, solution 520 and questions with matched answers 525. An extraction engine identifies the data segments (e.g., 500A to 500E) corresponding to the categories (e.g., 505, 510, 515, 520 and 525) from the incident documents of FIGS. 4A and 4B.

In one embodiment, the extraction engine includes different components such as, but not limited to an issue description analyzer, a solution finder, a solution analyzer, a question/approach marker, an answer/approach outcome finder and an attribute value finder. The issue description analyzer identifies various sections of issue description from the incident document, such as the root cause 505, the key issue description 510, and goal 515. The solution finder and the solution analyzer together identify a solution for the issue from the incident document. The question/approach marker and the answer/approach outcome finder together identify questions/approaches and extract answers and outcome of the marked approach. Further, the attribute value finder extracts entities such as customer message number, short text, component, processor, release details, status, priority, entered date, and the like from the incident document.

Figure 6A:
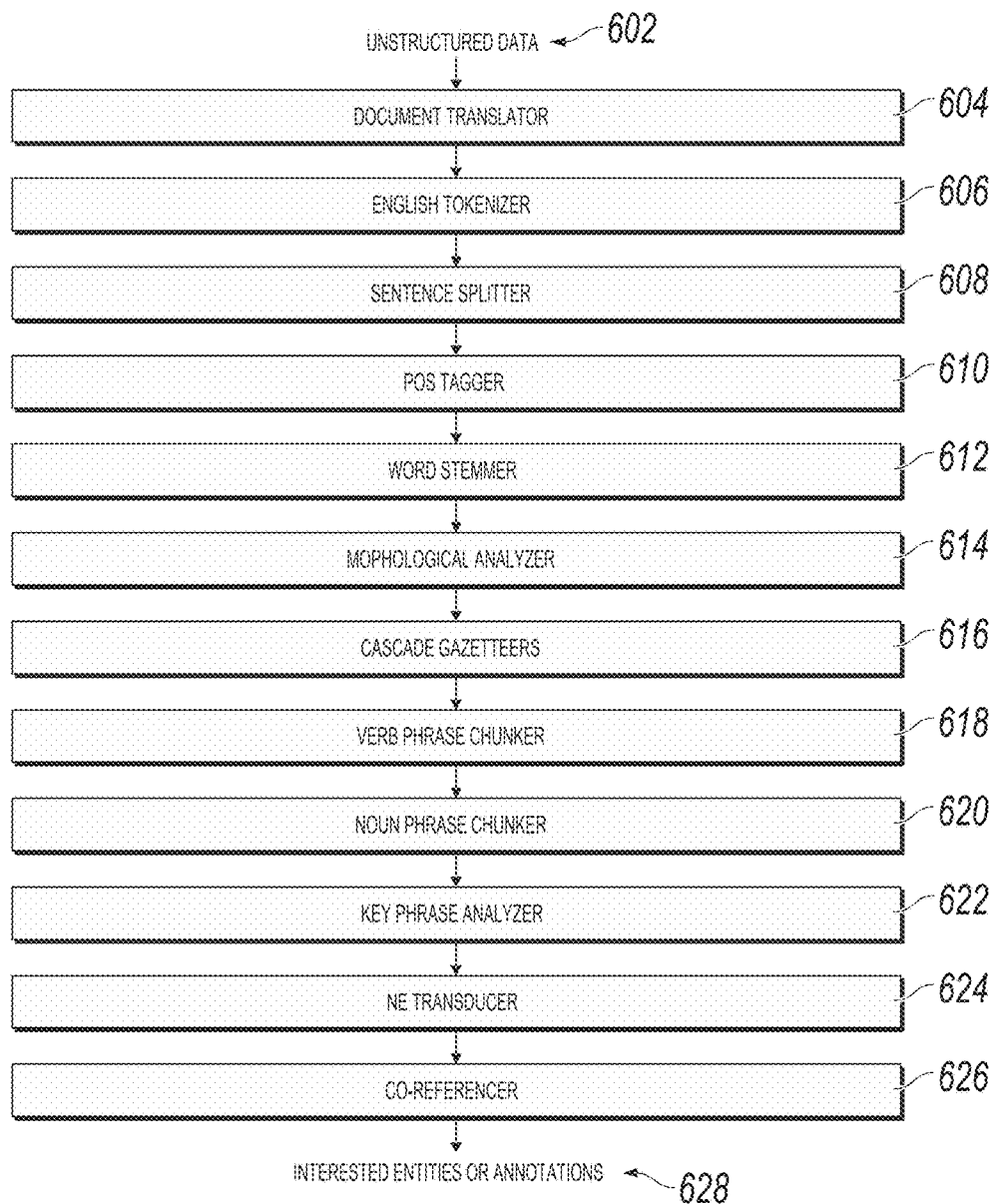
FIG. 6A is a block diagram illustrating phase one in generating a knowledge base, according to an embodiment.

In an embodiment, extracting unstructured input data from information sources and converting the input data into structured format by the extraction engine to generate a knowledge base includes two phases. For example, extraction of problem solving data from the incident documents and the product forum pages to generate the knowledge base involves two phases. FIG. 6A is a block diagram illustrating phase one in generating a knowledge base, according to an embodiment. An extraction engine may be implemented on SAP® HANA platform, for instance. Further, the extraction engine may employ natural language processing (NLP) tools provided by advanced data processing features of SAP® HANA for information extraction. Thereby, the extraction engine enables real time extraction capabilities and parallel processing capabilities. In one embodiment, the extraction engine identifies interested entities or annotations 628 by NPL. The NLP tools may include document translator 604, English tokenizer 606, sentence splitter 608, parts of speech (POS) tagger 610, word stemmer 612, morphological analyzer 614, cascade gazetteers 616, verb phrase chunker 618, noun phrase chunker 620, key phrase analyzer 622, named entity (NE) transducer 624 and co-referencer 626. Further, the extraction engine may include a custom built rules engine that defines advanced named entity extraction and defines relation extraction. The custom rules are defined in modules of a second phase of data extraction mentioned in FIG. 6B. Further, the custom rules are a set of linguistic rules which are defined over the entities available to modules from corresponding predecessor modules, a combination of regular expressions and context specifiers such as within and contains. For example, (({Sentence} within {description section}) containing ({Clause} with ({error type} followed by {zero or up to maximum three tokens} followed by {action lookup}))).

The document translator 604 identifies language of unstructured data 602 and translates the unstructured data 602 from the identified language to English language, when the unstructured data is in a language other than English. The English tokenizer 606 divides or splits content (e.g., text) of the unstructured data 602 into simple tokens such as numbers, punctuation and words of different types. Further, the English tokenizer 606 distinguishes between words in uppercase and lowercase, and between types of punctuation. The sentence splitter 608 is a cascade of finite-state transducers that segments the text into sentences and sentence splits. The POS tagger 610 generates a parts-of-speech tag on words or symbols. The word stemmer 612 identifies stem of tokens and adds a new feature to the tokens. The morphological analyzer 614 considers the tokens and the tokens' part of speech tag, and identifies lemma and an affix. The identified lemma and the affix are then added as features of the tokens.

The cascade gazetteers 616 identify entity names in the text based on lists. Gazetteer lists used are plain text files with one entry per line. The verb phrase chunker 618 and the noun phrase chunker 620 identify verb phrases and noun phrases respectively from the text. The key phrase analyzer 622 identifies key phrases from the text. The key phrase analyzer 622 considers frequency and minimum phrase length to identify the key phrases. The NE transducer 624 includes rules to act on earlier markups and identifies annotations or entities of interest. The co-referencer 626 identifies relations between named entities found by the NE transducer 624 to perform coreference resolution. The coreference resolution refers to the task of determining words that refer to the same objects or entities.

Figure 6B:
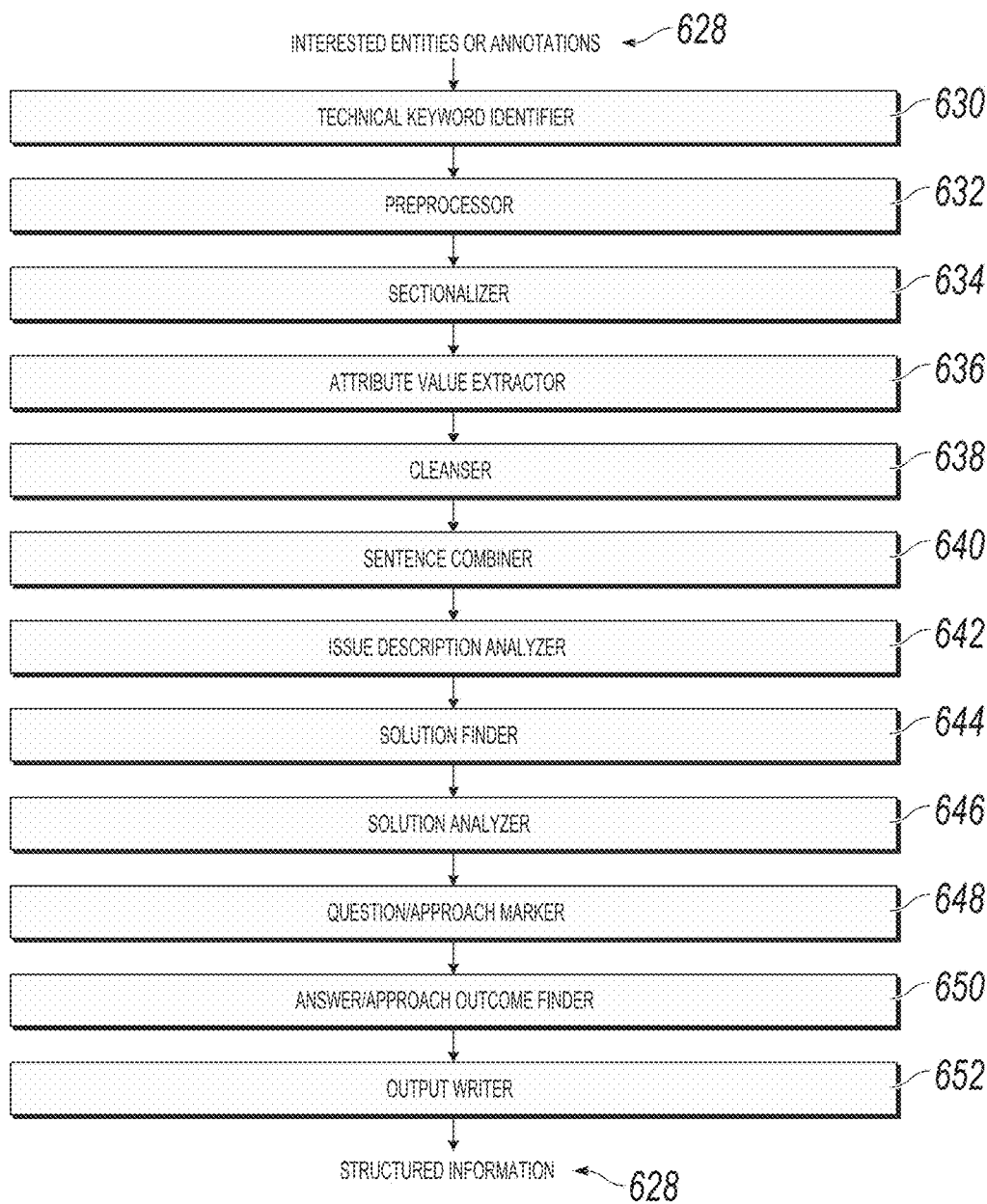
FIG. 6B is a block diagram illustrating second phase in generating a knowledge base, according to an embodiment.

FIG. 6B is a block diagram illustrating the second phase in generating a knowledge base, according to an embodiment. In the second phase of data extraction, advanced techniques are used on the interested entities or annotations 628 to generate the knowledge base in a structured format. Technical keyword identifier 630 identifies technical keywords such as function module, name of entries (e.g. short dump) in error log, class and class methods, transport number, fix (e.g., note) number, and the like. Preprocessor 632 performs preliminary processing such as grouping of verbs, identifying actions in sentences, and the like. Sectionalizer 634 splits the text into various sections, identifies beginning of a section, end of the section, categorizes the section, and adds section number and grouping order to the sections. Attribute value extractor 636 identifies semi-structured information from the incident such as incident number, category, component, processor, status, and the like. Further, the attribute value extractor 636 extracts knowledge bits from product technical documentation and/or wiki pages. The problem solving data (e.g. solutions) is then semantically mapped to the extracted knowledge bits or other relevant documents during runtime to incorporate learning capabilities into the system.

Cleanser 638 in the extraction engine operates at unstructured data level and is based on predefined extraction rules related to cleansing. For example, the Cleanser 638 removes irrelevant statements, such as greetings section, "thanks" or "regards" section, terms such as "requesting system connection", "open the system connection", "system connection is not working" and the like. Sentence combiner 640 combines group of related sentences based on their sequential occurrence in the text. Issue description analyzer 642 identifies entities defining the issue. Further, the issue description analyzer 642 categorizes the identified issue into sub-categories such as root cause of the issue, key issue description, goal to be achieved, additional description, additional root cause, additional goal, and the like. Solution finder 644 identifies a solution point in the incident document. The solution finder 644 identifies the solution point through factors, such as, but are not limited to point in the document where the issue reported has been resolved, point where the goal is attained or reached, and statement indicating issue closure in the document. The solution finder 644 may identify multiple solution points for a given incident document. The solution finder 644 uses verbs and their tenses along with noun phrases to identify the solution point. A custom gazetteer list may be defined to identify the statement indicating issue closure or a mentioning of issue closure.

Solution analyzer 646 may act upon the marked solution point and analyze sections that are in the vicinity of the solution point. The sections analyzed are context dependent and relevant sections where solutions are likely to be present may be considered. The solution analyzer 646 may identify entities related to the solution such as key solution, consultation provided, code fix provided, additional solution, and the like. Question/Approach marker 648 identifies the questions or approaches present in the sections, and adds details regarding type of sections and type of entity as features to the marked questions or approaches. The features may be used to identify answer or approach outcome. Answer/Approach outcome finder 650 may act on the previously marked questions or approaches. The answer/approach outcome finder 650 utilizes the features of a marked question or approach to identify the answers for the marked question or outcomes for the marked approach. The answers or approach outcomes are extracted from the sections that are opposite in context to the question/approach section. Output writer 652 may store extracted structured information 654 into flat files or a database, for instance.

Figure 7:
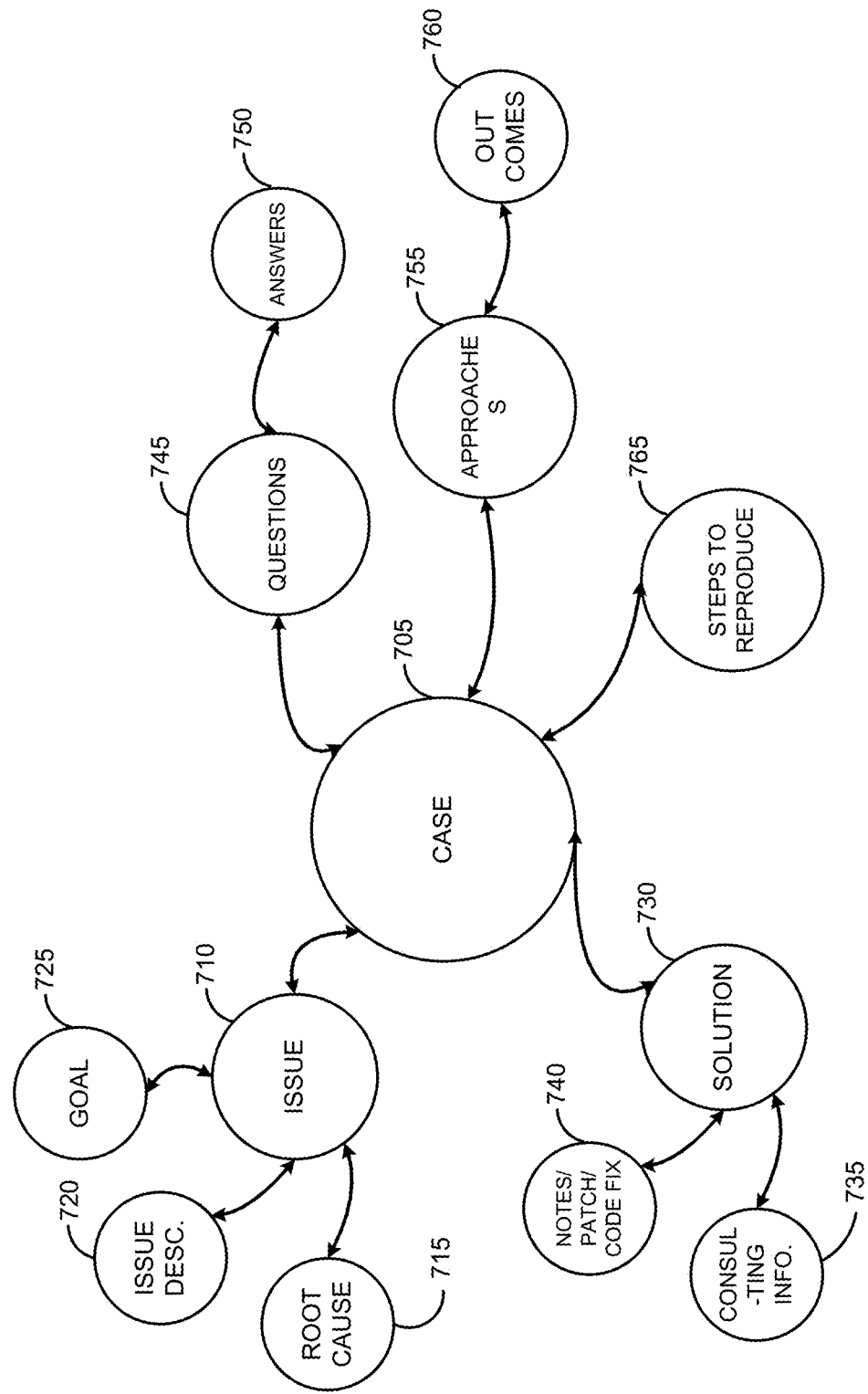
FIG. 7 is a schematic diagram illustrating mapping of data segments identified from an incident document, according to an embodiment.

FIG. 7 is a schematic diagram illustrating mapping of data segments identified from an incident document, according to an embodiment. When data segments are identified from the incident document based on different categories, the data segments are grouped together, depending on their similarity to create multiple clusters. The categories may include, but are not limited to issue, root cause, approach and solution.

In one exemplary embodiment, the data segments are treated as nodes in a cluster. Further, the data segments are linked to one another based on similarities between the data segments. For example, the data segments associated with a case node (e.g., 705) include issue node (e.g., 710), corresponding solution node (e.g., 730), questions node (e.g., 745), approaches node (e.g., 755), and steps to reproduce node (e.g., 765). Further, the data segments are further linked to other corresponding data segments. For example, the issue node (e.g., 710) is linked to root cause node (e.g., 715), issue description node (e.g., 720), and goal node (e.g., 725). The solution node 730 may be linked to consulting information node (e.g., 735) and notes/patch/code fix node (e.g., 740). The questions node (e.g., 745) and the approaches node (755) may be linked to answers node 750 and outcomes node 760 respectively. In an embodiment, an incident case/problem (e.g., 705) may be linked to one or more root cause nodes, one or more approach nodes and one or more solution nodes associated with different cases.

Figure 8:
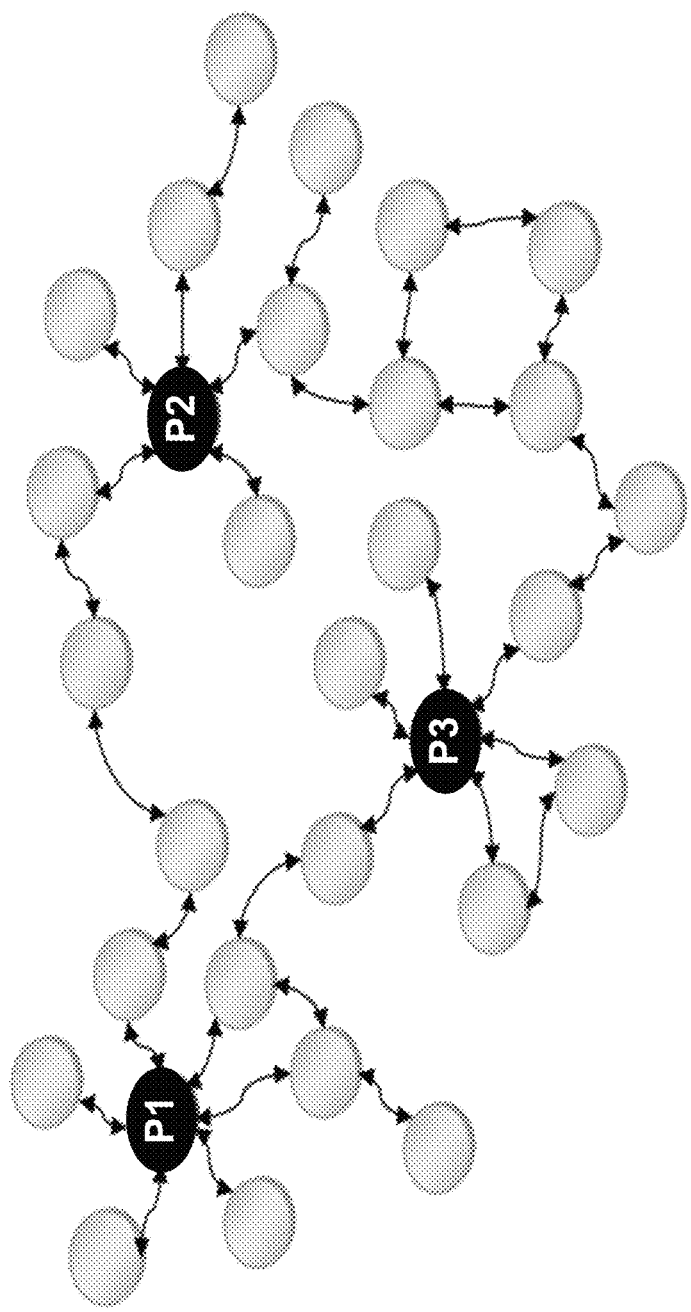
FIG. 8 is a schematic diagram illustrating clustering of data segments based on categories, according to an embodiment.

FIG. 8 is a schematic diagram illustrating clustering of data segments based on categories, according to an embodiment. Grouping the data segments includes grouping the one or more nodes corresponding to the data segments based on a score between the data segments and a pre-defined threshold. In one exemplary embodiment, the score determines average distance between the data segments. For example, problem category is taken as an example for describing the clustering of the data segments. Data segments representing problems are represented as nodes. The score is determined using equation (1).

$$\text{Score} = (\text{Distance(root cause of node 1, root cause of node 2)} + \text{Distance (issue description of node 1, issue description of node 2)} + \text{Distance (goal of node 1, goal of node 2)})/3 \quad (1)$$

In one example, distance between two data segments is calculated using methods such as, but are not limited to term frequency-inverse document frequency (TF-IDF) vector and cosine vector. Initially, a problem node is considered as a cluster. Further, clustering engine reads the clusters to match and find similar problem nodes and creates a link between the similar nodes. Thereby, a cluster of similar problem nodes is generated. The similarity between the nodes is determined by calculating the score between both node texts and the data segments. The scores may be calculated based on different similarity matrices.

For example, the score is in a range of 0 and 1, where a score of 0 (zero) indicates that the node texts do not match and a score of 1 (one) indicates a complete match. When the score between two problem nodes exceeds a first threshold, e.g. 0.65, the two problem nodes may be considered to be closely matched. When the score is above a second threshold, e.g. above 0.95, the two problem nodes may be merged into a single node. The problem nodes may be merged because the problem statements in the nodes are the same. The problem node may be linked to other problem nodes that satisfy a score in the range of 0.65 and 0.95, for instance. When a new incoming node A is linked to node B, it may be determined whether other nodes linked to B at a depth of one also match with node A. The link is established with the nodes where the score exceeds a threshold.

In an embodiment, the nodes are assigned ranks. The rank of a node is calculated based on a number of nodes that are linked to the node, a number of nodes that are merged to the node, and a number of times the node was searched. A node with a rank more than a first preset threshold becomes a star node of the cluster (e.g. P1, P2, P3 in FIG. 8). Further, the rank is recalculated every time one of the changes occurs to the node. When the rank of a node crosses a second preset threshold greater than the first preset threshold, the node is considered a red giant node, for instance. Further, a solution node linked to the red giant node may be considered as the best possible solution to all the problems that belong to the problem cluster.

For an input problem statement, the node with a best matched problem statement is selected. The score between the node and the input problem statement is compared against a match threshold. When score is greater than the match threshold (e.g. 0.75), a solution corresponding to the node is selected. For multiple problem nodes having score greater than the match threshold, the corresponding solutions are selected and the best fit solution is returned for the new problem statement. On the other hand, when there are no matching problem statements exceeding the match threshold, the node with highest available score is considered, and compared against a minimum match threshold (e.g. 0.5). When the node with the highest score is found to exceed the minimum match threshold, the solution cluster corresponding to the node is checked for the best fit solution. In case when there are no nodes having a score exceeding the minimum match threshold, the user is requested to provide more data, as an appropriate solution could not be searched with the given problem statement.

Figure 9:
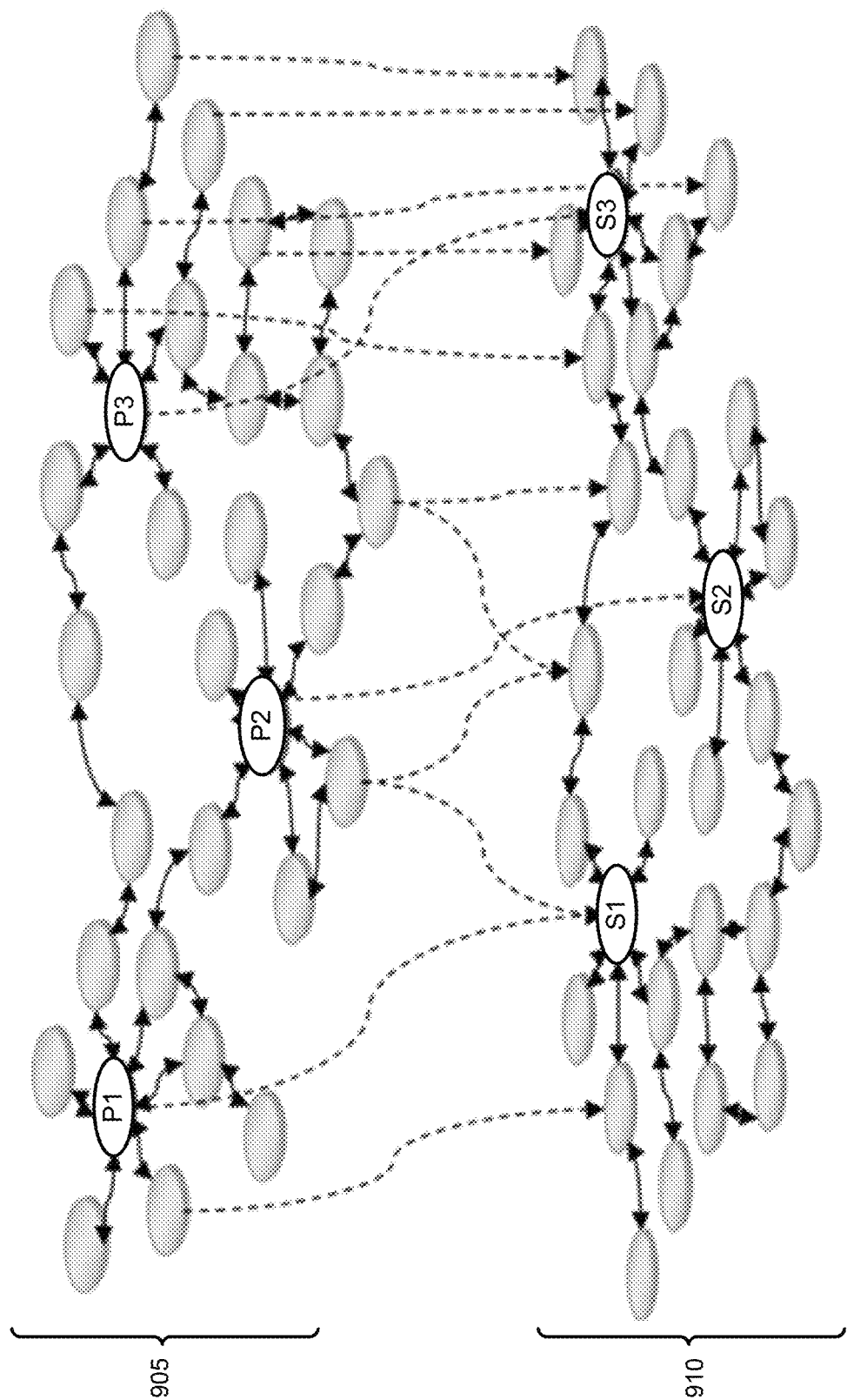
FIG. 9 is a schematic diagram illustrating an example process of linking of associated clusters, according to an embodiment.

FIG. 9 is a schematic diagram illustrating an example process of the linking of associated clusters, according to an embodiment. The plurality of data clusters are linked based on semantic relationships between one or more nodes in the plurality of data clusters. FIG. 9 illustrates linking between problem clusters 905 and solution clusters 910. A problem node in the problem clusters 905 retains a link to a solution node in the solution clusters 910 that is semantically associated with the problem. Thereby, links are established between nodes across the problem clusters 905 and the solution clusters. Similarly links may be established between two or more other clusters (e.g., approach clusters, root cause clusters and solution clusters).

In one exemplary embodiment, a node is initially considered as an individual cluster. The nodes of different categories are then linked together to form bigger clusters. For example, the problem node is linked to corresponding solution nodes. Further, the problem node may be linked to more than one solution node. In an embodiment, a text summary may be created using different solution nodes and provided to a user as a single solution. Further, hypertext links and other resource materials relevant to the solution may be provided with the solution.

In one exemplary embodiment, when a search for a new problem statement does not result in a problem node having a match greater than the match threshold (e.g. 0.75), the minimum match threshold is considered. When a problem node satisfies the minimum match threshold, the solution cluster corresponding to the problem node is checked, and a red giant or star node of the solution cluster is provided as the solution. When the problem statement directly matches with a problem node by exceeding the match threshold, the order of preference in retrieving the solution may be the red giant node and directly linked to solution node. When the problem statement yields a problem node with a score below the match threshold, but above the minimum match threshold, the red giant node or the star node of the linked solution cluster is provided as the solution.

In one embodiment, a cluster is associated with a list of relevant keywords and frequency of occurrences of these keywords within the problem nodes and the boundary of the cluster. The weight of a keyword depends on the frequency of occurrence of the keyword in the problem nodes of the cluster. The weight of the keyword may be used for calculating the score to match an input problem statement with the problem nodes in the cluster. Higher the frequency of occurrence, higher is the weight of the keyword while calculating the score for matching.

Figure 10:
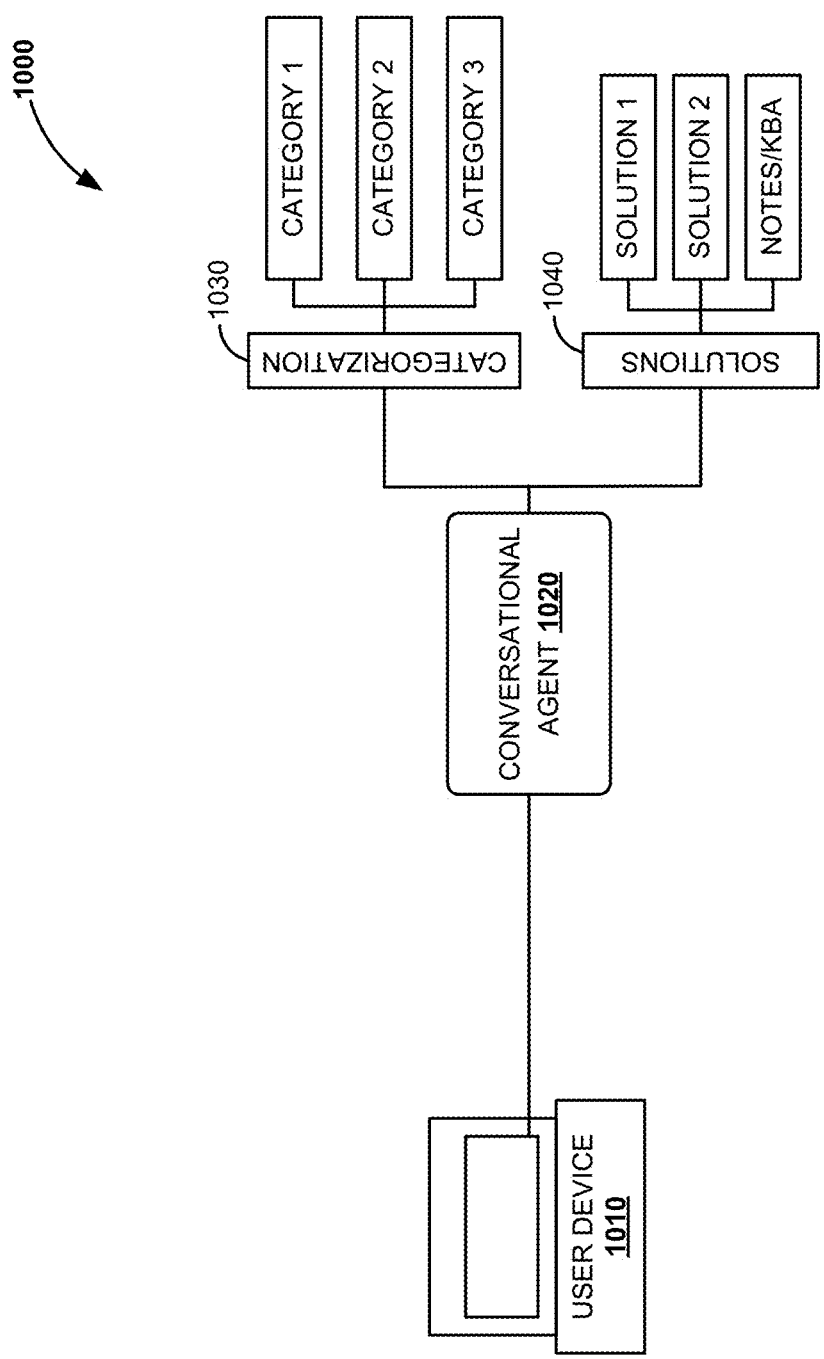
FIG. 10 is a block diagram illustrating an example process to provide a knowledge driven solution inference for a new incident, according to an embodiment.

FIG. 10 is a block diagram illustrating example process 1000 to provide a knowledge driven solution inference for a new incident, according to an embodiment. Customer (e.g. user device 1010) facing an issue provides issue details to conversational agent (e.g., 1020) to report an incident. Further, content or text in the incident is analyzed using natural language processing techniques. The incident is categorized 1030 (e.g. category 1, category 2, or category 3) based on the issue text description. Further, solutions 1040 (e.g. solution 1 and/or solution 2) and notes for the incident are created in an incident management system. In one exemplary embodiment, the customer (e.g. user device 1010) further chat/interact with the conversational agent 1020 and receive better solution recommendations. Further, the user may rate the solutions recommended, and machine learning improves the solution accuracy over time.

A process for providing solution inference includes receiving an incident from a customer in an incident management system. Upon receipt of the incident, knowledge driven solution inference system analyzes the issue text description to identify a problem context based on the issue text description. Further, a knowledge base is searched to identify closely related incidents which were previously resolved. Similar incidents are bundled together based on textual. Further, notes that might solve the incident are provided to find solution for the received or reported incident. In one exemplary embodiment, the knowledge driven solution inference system is configured to generate self-adapting knowledge documents and provides support for generation of solutions and related information. Further, output display of the knowledge driven solution inference system may have variant configuration for different modes of output, such as, consulting mode, technical mode, and knowledge mode.

FIG. 11 is an example screenshot of a user interface of a knowledge driven solution inference system, according to an embodiment. The knowledge driven solution inference system receives an input query. Further, a solution for the input query is retrieved by matching the input query to the one or more data clusters in a knowledge base. The retrieved solution (e.g., 1100) is displayed along with notes and other suggested solutions as shown in FIG. 11. In one exemplary embodiment, an option is provided to obtain customer feedback. For example, feedback buttons in the user interface such as "LIKE" 1110A and "DISLIKE" 1110B are provided over recommended solutions.

Figure 12:
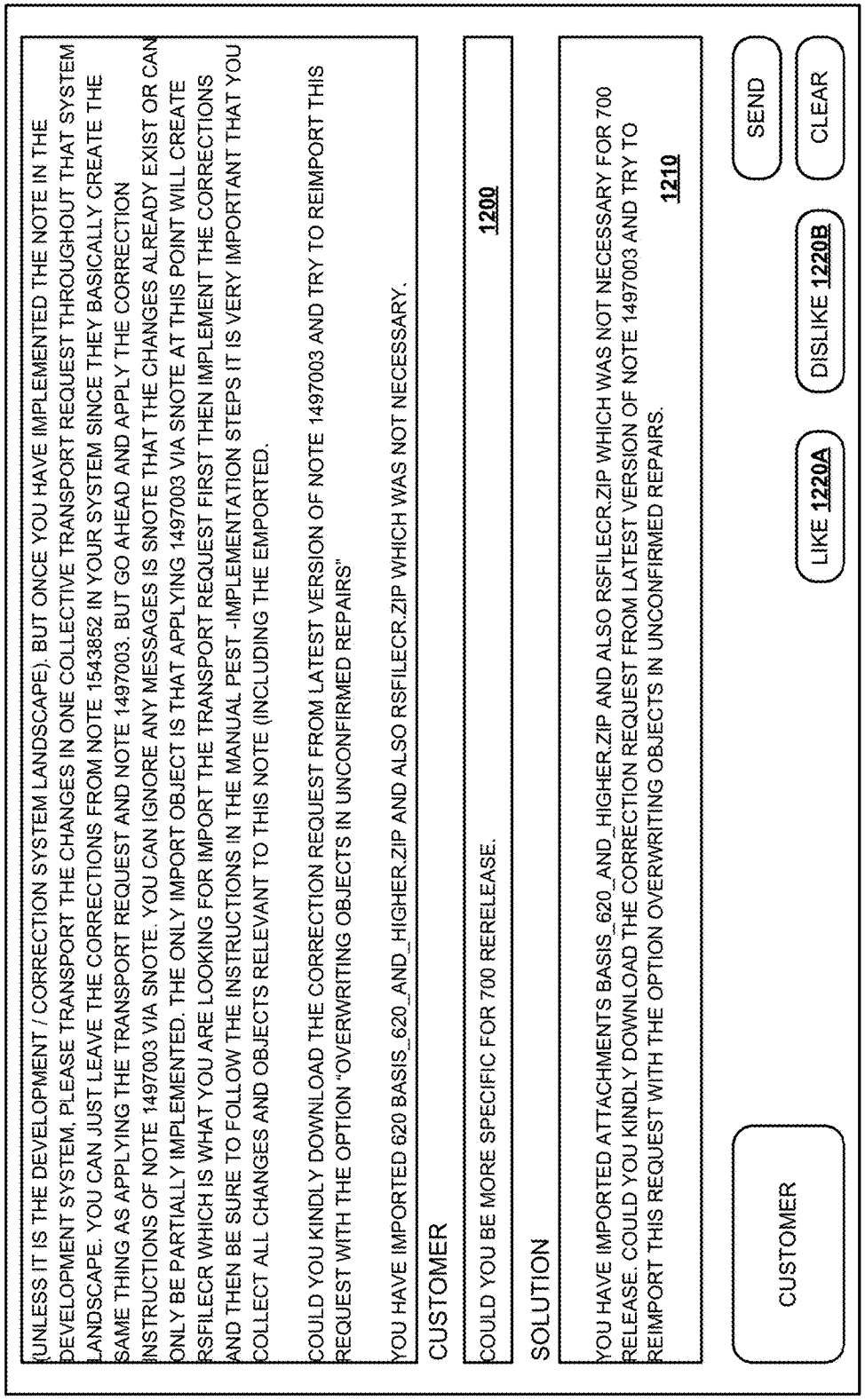
FIG. 12 is an example screenshot of a user interface of a knowledge driven solution inference system, according to an embodiment.

FIG. 12 is an example screenshot of a user interface of a knowledge driven solution inference system, according to an embodiment. Upon receiving a solution (e.g., 1100 of FIG. 11), a customer may send a follow up query (e.g., 1200). Based on the received follow up query, a new solution (e.g., 1210) is provided. The knowledge driven solution inference system may update the solution by either refining the already provided solution or providing a different solution based on the follow up query.

In one exemplary embodiment, solution accuracy is improved over time by obtaining customer feedback. One way of obtaining customer feedback is from the feedback received through feedback buttons (e.g., "LIKE" 1220A and "DISLIKE" 1220B). In another method, linguistic processing of follow up input (e.g., text and sentiments associated with the text) from the customer may be used to rank the solution. For example, for a solution, the customer provides follow up input stating "wow. That really helped to solve the problem. Thank you very much", rank of the solution would be increased. In one embodiment, the rank of the solution is determined by solution relevance score, relevancy weightage factor, solution feedback score, feedback weightage factor, solution frequency score and frequency weightage factor. The solution relevance score can be determined by relevancy of the solution to a particular query and the relevancy weightage factor is a predetermined numeric value for the level of the solution relevance. The solution feedback score can be determined by the feedback provided by the customer and the feedback weightage factor is a predetermined numeric value for the kind of feedback. The solution frequency score can be determined by number of times the solution is provided to the query and the frequency weightage factor is a predetermined numeric value for the solution frequency. The solution rank is determined using equation (2), for instance.

$$\text{Solution rank} = ((\text{solution relevancy score} \times \text{relevancy weightage factor}) + (\text{solution feedback score} \times \text{feedback weightage factor}) + (\text{solution frequency score} \times \text{frequency weightage factor}))/3 \qquad (2)$$

The process described above is not limited to embodiments that solve any disadvantages or that operate only in environments such as those described above. Further, the above described process to provide a knowledge driven solution inference can be implemented in any support or service system of different fields.

Some embodiments may include the above-described methods being written as one or more software components. These components, and the functionality associated with them, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computing system that is remotely located from a second computing system containing an interface level (e.g., a graphical user interface). These first and second computing systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computing system which causes the computing system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 13:
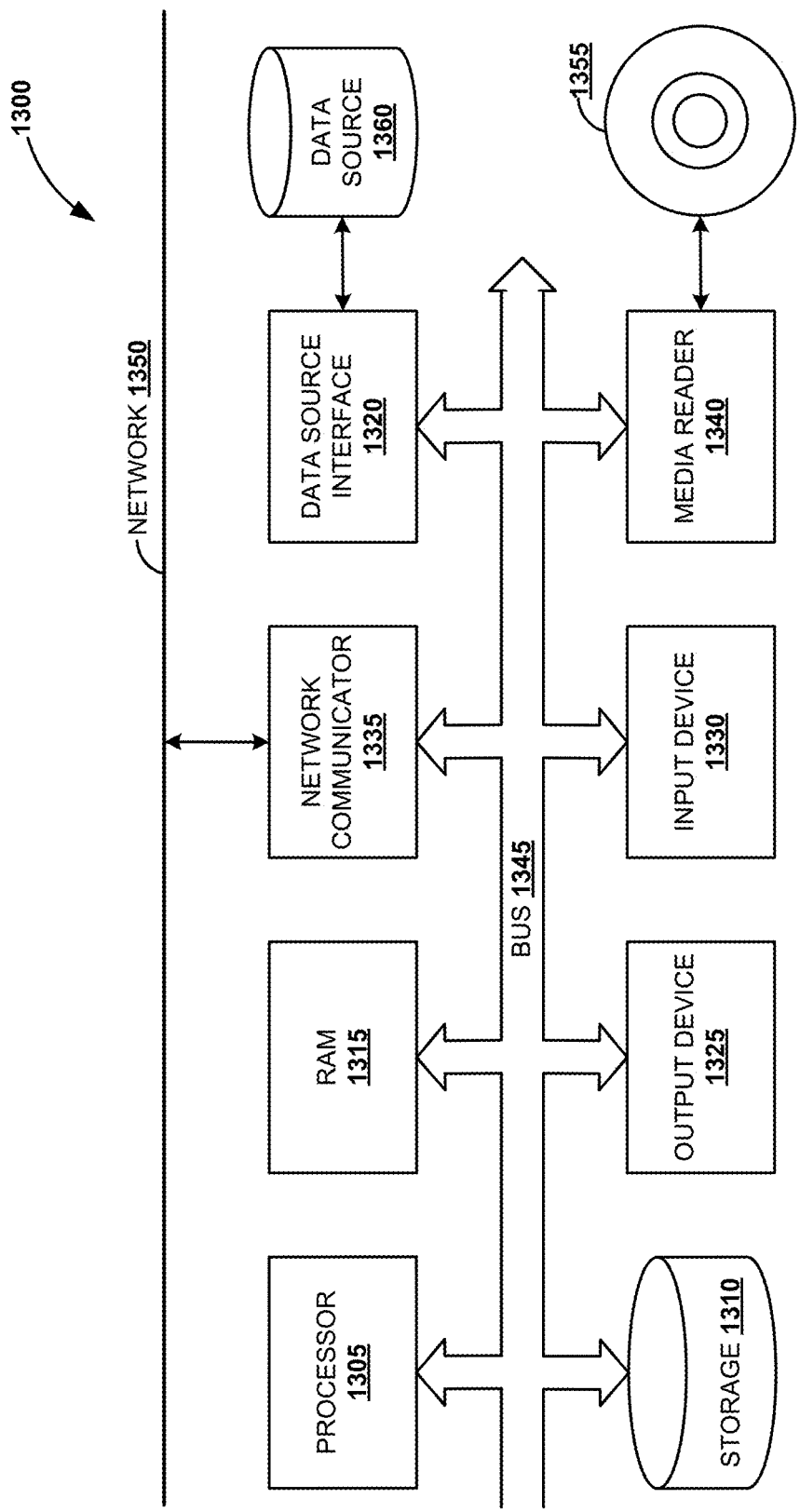
FIG. 13 is a block diagram of an example computing system, according to an embodiment.

FIG. 13 is a block diagram of example computing system 1300, according to an embodiment. The computing system 1300 includes a processor 1305 that executes software instructions or code stored on a computer readable storage medium 1355 to perform the above-illustrated methods. The processor 1305 can include a plurality of cores. The computing system 1300 includes a media reader 1340 to read the instructions from the computer readable storage medium 1355 and store the instructions in storage 1310 or in random access memory (RAM) 1315. The storage 1310 provides a large space for keeping static data where at least some instructions could be stored for later execution. According to some embodiments, such as some in-memory computing system embodiments, the RAM 1315 can have sufficient storage capacity to store much of the data required for processing in the RAM 1315 instead of in the storage 1310. In some embodiments, the data required for processing may be stored in the RAM 1315. The stored instructions may be further compiled to generate other representations of the instructions and dynamically stored in the RAM 1315. The processor 1305 reads instructions from the RAM 1315 and performs actions as instructed. According to one embodiment, the computing system 1300 further includes an output device 1325 (e.g., a display) to provide at least some of the results of the execution as output including, but not limited to, visual information to users and an input device 1330 to provide a user or another device with means for entering data and/or otherwise interact with the computing system 1300. One or more of these output devices 1325 and input devices 1330 could be joined by one or more additional peripherals to further expand the capabilities of the computing system 1300. A network communicator 1335 may be provided to connect the computing system 1300 to a network 1350 and in turn to other devices connected to the network 1350 including other clients, servers, data stores, and interfaces, for instance. The modules of the computing system 1300 are interconnected via a bus 1345. Computing system 1300 includes a data source interface 1320 to access data source 1360. The data source 1360 can be accessed via one or more abstraction layers implemented in hardware or software. For example, the data source 1360 may be accessed by network 1350. In some embodiments the data source 1360 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiments are described herein for illustrative purposes, various equivalent modifications are possible within the scope of the embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium storing instructions, which when executed by a computer cause the computer to:
   extract, by an extraction engine, unstructured data from one or more information sources, wherein the extracted unstructured data is stored in a data repository;
   identify, by the extraction engine and from the data repository, data segments corresponding to a plurality of categories in the extracted unstructured data by natural language processing;
   group, by a clustering engine and from the data repository, the data segments into a plurality of data clusters based on scores between the data segments;
   generate, by the clustering engine, a structured knowledge base by linking the plurality of data clusters, wherein the structured knowledge base includes at least one link between a first data segment in a first data cluster and a second data segment in a second data cluster, and wherein the first data cluster is a problem cluster and the second data cluster is a solution cluster; and
   provide, by an inference engine, a knowledge driven solution inference based on the generated knowledge base.

2. The non-transitory computer-readable medium of claim 1, wherein providing the knowledge driven solution inference further comprises:
   receiving an input query;

retrieving one or more solutions to the input query by matching the input query to the plurality of data clusters in the knowledge base; and rendering the retrieved one or more solutions.

3. The non-transitory computer-readable medium of claim 2, further comprising instructions which when executed by the computer cause the computer to:

receive a follow up query based on the rendered one or more solutions; and render a new solution in response to the follow up query.

4. The non-transitory computer-readable medium of claim 1, wherein the plurality of clusters comprises:

problem clusters, solution clusters, root cause clusters, and approach clusters.

5. The non-transitory computer-readable medium of claim 1, wherein linking the plurality of data clusters is based on semantic relationships between one or more nodes in the plurality of data clusters.

6. The non-transitory computer-readable medium of claim 1, wherein grouping the data segments comprises grouping the one or more nodes corresponding to the data segments based on a score between the data segments and a pre-defined threshold.

7. The non-transitory computer-readable medium of claim 1, wherein the data segments are represented as nodes and ranks of the nodes are assigned based on a number of other nodes linked to a node, a number of other nodes merged to the node, and a number of times the node is searched.

8. A computer implemented method to provide a knowledge driven solution inference, comprising:

extracting, by an extraction engine, unstructured data from one or more information sources, wherein the extracted unstructured data is stored in a data repository;

identifying, by the extraction engine and from the data repository, data segments corresponding to a plurality of categories in the extracted unstructured data by natural language processing;

grouping, by a clustering engine and from the data repository, the data segments into a plurality of data clusters based on scores between the data segments;

generating, by the clustering engine, a structured knowledge base by linking the plurality of data clusters, wherein the structured knowledge base includes at least one link between a first data segment in a first data cluster and a second data segment in a second data cluster, and wherein the first data cluster is a problem cluster and the second data cluster is a solution cluster; and providing, by an inference engine, the knowledge driven solution inference based on the generated knowledge base.

9. The computer implemented method of claim 8, wherein providing the knowledge driven solution inference further comprises:

receiving an input query;

retrieving one or more solutions to the input query by matching the input query to the plurality of data clusters in the knowledge base; and rendering the retrieved one or more solutions.

10. The computer implemented method of claim 9, further comprising:

receiving a follow up query based on the rendered one or more solutions; and rendering a new solution in response to the follow up query.

11. The computer implemented method of claim 8, wherein the plurality of clusters comprises:

problem clusters, solution clusters, root cause clusters, and approach clusters.

12. The computer implemented method of claim 8, wherein linking the plurality of data clusters is based on semantic relationships between one or more nodes in the plurality of data clusters.

13. The computer implemented method of claim 8, wherein grouping the data segments comprises grouping the one or more nodes corresponding to the data segments based on a score between the data segments and a pre-defined threshold.

14. The computer implemented method of claim 8, wherein the data segments are represented as nodes and ranks of the nodes are assigned based on a number of other nodes linked to a node, a number of other nodes merged to the node, and a number of times the node is searched.

15. A computing system to provide a knowledge driven solution inference, comprising:

at least one processor; and a computer-readable medium communicative with the at least one processor and storing instructions executable by the at least one processor, wherein the instructions instruct the at least one processor to:

extract, by an extraction engine, unstructured data from one or more information sources, wherein the extracted unstructured data is stored in a data repository;

identify, by the extraction engine and from the data repository, data segments corresponding to a plurality of categories in the extracted unstructured data by natural language processing;

group, by a clustering engine and from the data repository, the data segments into a plurality of data clusters based on scores between the data segments;

generate, by the clustering engine, a structured knowledge base by linking the plurality of data clusters, wherein the structured knowledge base includes at least one link between a first data segment in a first data cluster and a second data segment in a second data cluster, and wherein the first data cluster is a problem cluster and the second data cluster is a solution cluster; and provide, by an inference engine, the knowledge driven solution inference based on the generated knowledge base.

16. The computing system of claim 15, wherein providing the knowledge driven solution inference further comprises:

receiving an input query;

retrieving one or more solutions to the input query by matching the input query to the plurality of data clusters in the knowledge base; and rendering the retrieved one or more solutions.

17. The computing system of claim 16, further comprising:

receive a follow up query based on the rendered one or more solutions; and render a new solution in response to the follow up query.

18. The computing system of claim 15, wherein linking the plurality of data clusters is based on semantic relationships between one or more nodes in the plurality of data clusters.

19. The computing system of claim 15, wherein grouping the data segments comprises grouping the one or more nodes corresponding to the data segments based on a score between the data segments and a pre-defined threshold.

20. The computing system of claim 15, wherein the data segments are represented as nodes and ranks of the nodes are assigned based on a number of other nodes linked to a node, a number of other nodes merged to the node, and a number of times the node is searched.

* * * * *